June 4, 1963    T. R. SMITH    3,092,478
TUBE TYPE DUST COLLECTOR ARRANGEMENT
Filed May 31, 1960
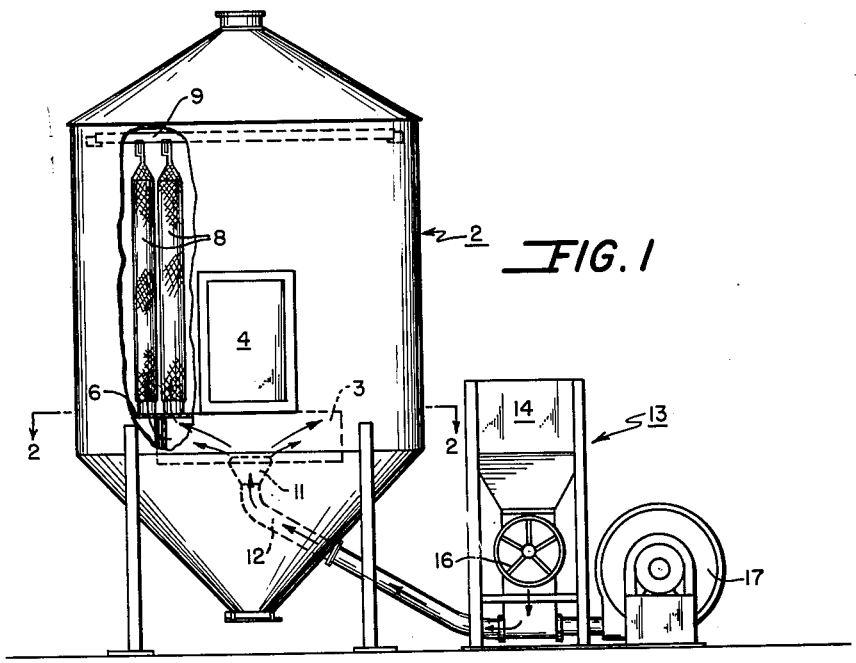
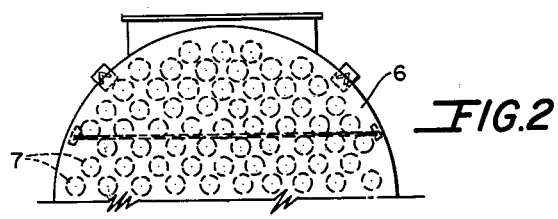
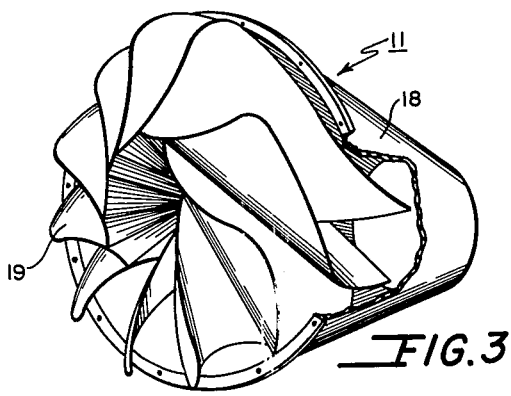
INVENTOR.
TOM R. SMITH
BY
Ralph B. Brick
ATTORNEY 3,092,478
TUBE TYPE DUST COLLECTOR ARRANGEMENT
Tom R. Smith, Louisville, Ky., assignor to American Air Filter Company, Inc., Louisville, Ky., a corporation of Delaware
Filed May 31, 1960, Ser. No. 32,746
1 Claim. (Cl. 55—262)

The present invention relates to dust collectors and more particularly to dust collectors of the gas pervious tube type which utilize filter aid materials therewith.

It is known in the filtering art to coat gas pervious fabric filter tubes of tube type dust collectors with finely divided materials such as asbestos in order to enhance the filtering characteristics of the filter fabric, particularly with respect to fine particles. In the past, such finely divided filter aid material has been introduced randomly into a plenum of the dust collector upstream of the filter tubes and allowed to be deposited by movement of the gaseous stream to be treated along the inner surface of the tubes. As a result of this arrangement, the overall resistance of the collector on occasion has been inordinately high with a concomitant decrease in operating filtering efficiency.

The present invention, recognizing that this inordinate increase of resistance often is occasioned by the inefficient application of filter aid material to the tubes, provides an improved, straightforward and economical arrangement for applying such filter aid material to the tubes so that the overall efficiency of the collector can be maintained at high levels over long operational periods. More particularly, the present invention provides a dust collector comprising a housing having spaced gas inlet and outlet means, such housing including a plurality of filter tubes disposed therein and connected to a filter tube header downstream of the gas inlet, the housing further including means upstream of the filter tube header between the header and the gas inlet to disperse and distribute finely divided filter aid material uniformly along the entrances of such filter tubes so that the filter aid material is deposited uniformly along the interior surfaces of all of the tubes.

Various other features of the present invention will become obvious to one skilled in the art upon reading the disclosure set forth hereinafter.

Referring to the drawing which discloses one advantageous embodiment of the present invention:

FIGURE 1 is a partially broken away vertical view of a dust collector of the tube type, the collector incorporating the improved structure for dispersing and distributing filter aid material to the filter tubes in a uniform manner;

FIGURE 2 is a cross-sectional view of a portion of the filter tube header of FIGURE 1 taken in a plane passing through the line 2—2 of FIGURE 1;

FIGURE 3 is an enlarged perspective view of the filter aid distributing means of the dust collector apparatus of FIGURE 1.

Referring to FIGURE 1 of the drawings, a vertically disposed cylindrical dust collector housing 2 is disclosed. Housing 2 is provided at its lower portion with dirty gas inlet 3 (broken lines) and at its intermediate portion spaced from such dirty gas inlet with clean gas outlet 4. It is to be understood that dirty gas inlet 3 can communicate through a system of duct work with a dirty gas source such as the offtake from a foundry furnace or the like (not shown).

Extending in a horizontal plane transverse housing 2 downstream of inlet 3 so as to be intermediate of such inlet and gas outlet 4 is filter tube header plate 6. As can be seen in FIGURE 2, header plate 6 is provided with a plurality of spaced apertures 7 with which the ends of filter tubes 8 communicably connect, as will be seen hereinafter. Filter tubes 8, which can be of cotton sateen or any one of a number of other similar types of gas pervious materials, are suspended from a right angle grid frame member 9 which extends in a horizontal plane transverse the upper portion of housing 2. Tubes 8 are closed at their suspended upper ends and, as aforementioned, communicably connect at their opposite lower ends through a suitable sleeve arrangement with apertures 7 of header plate 6. Since the suspension arrangement of the tubes and their connection with header plate 6 is known in the art and does not constitute a critical part of the present invention, it is only disclosed schematically herein.

Centrally positioned below header plate 6 in suitably preselected spaced relationship therefrom is a filter aid disperser and distributor member broadly designated by reference numeral 11. Distributor 11 is connected through duct 12 to a filter aid supply source 13 which includes a storage hopper 14 and a rotary lock 16 positioned below the hopper to control the amount of filter aid material introduced from the hopper into duct 12. Connected to the extremity of duct 12 opposite distributor 11 is a suitable blower mechanism 17 which serves to deliver filter aid material passed to duct 12 from hopper 14 through distributor 11 and ultimately to the inner surface of tubes 8.

As can be seen in FIGURE 3 of the drawings, distributor 11 is comprised of a truncated open-ended housing or enclosure 18 having disposed therein a plurality of spaced blades 19. These blades 19 extend radially outward from a common vertical axis and are curved in concave fashion to form a rosette type distributor. With the vertical axis from which the blades 19 extend in alignment with the longitudinal central axis of housing 2, distributor 11 is capable of delivering and dispersing particles of filtering aid material passed therethrough from duct 12 in dispersed cone like form over a large face area to thus insure uniform distribution along the entrance of filter tubes 8 and subsequently along the inner surfaces of tubes 8, avoiding any undue concentration of such filtering aid material in only a few of the filter tubes.

In a typical operation of the apparatus disclosed, with tubes 8 free of filter aid material, filter aid material is delivered from storage hopper 14 through lock 16 into duct 12 and is blown through duct 12 by means of blower 17. Advantageously, the material can be finely divided asbestos which has a very fine fabric size so as to permit collection of the fine dust particles from the gas to be treated. The filter aid material is propelled through duct 12 by the blower at any one of a number of preselected rates and advantageously at about 6 feet per minute. As the material passes through distributor 11 into housing 2 from duct 12 it disperses and spreads into solid cone form and is distributed uniformly along the entrances of tubes 8 and with the aid of the dirty gas to be treated entering housing 2 through gas inlet 3, it is deposited uniformly along the inner surfaces of the tubes. The material is allowed to build up on the inner surface of the tubes until a preselected concentration is obtained, for example .1 of a pound to .2 of a pound per sq. ft. of tube area. Once the preselected concentration of filter aid material has been reached, blower 17 is turned off and the dust collector allowed to continue in operation over a period of several months or longer. When the resistance of the collector becomes excessive and the effectivity of the filter aid material has been diminished substantially, the tubes are vibrated by some suitable mechanism (not shown) to shake the used filter aid material into the hopper of housing 2, and the operation is repeated. In this connection, it is to be noted that such operation ordinarily takes about a 15 minute period. Thus, in only a brief period of time, the filter tubes are prepared with a uniform distribution of filter aid material in a striaghtforward and efficient manner to permit improved filtering operations over extended periods of time.

The invention claimed is:

A dust collector comprising a vertical housing having spaced gas inlet and gas outlet means, a filter tube header having a plurality of apertures disposed therein extending in a horizontal plane transverse said housing intermediate said gas inlet and gas outlet means, a plurality of spaced pervious filter tubes vertically suspended in said housing downstream of said header, each of said tubes having one end communicably connected to an aperture in said header and the opposite end closed, filter aid supply means communicating with said housing upstream of said header, blower means cooperating with said filter aid supply means to introduce finely divided particles of filter aid material from said supply means into said housing and the tubes disposed therein, and a filter aid particle disperser and distributor disposed in spaced relationship from and in axial alignment with the central portion of said header upstream thereof and cooperating with said blower means to disperse and distribute the finely divided particles of filter aid material uniformly and substantially equally along the interior surfaces of said tubes, said disperser and distributor including an open ended enclosure in communication with said filter supply means, a plurality of spaced blades arranged in said open ended enclosure to extend radially from a vertical axis in alignment with the central axis of said housing in the form of a rosette and curved to deliver filter aid material to said filter tubes in a dispersed solid cone shaped pattern to insure uniform and substantially equal application of the material along the interior surfaces of all of said tubes.

References Cited in the file of this patent

UNITED STATES PATENTS

| | | |
|---|---|---|
| 134,261 | Dennison | Dec. 24, 1872 |
| 1,724,041 | Plaisted | Aug. 13, 1929 |
| 2,453,951 | Vedder | Nov. 16, 1948 |
| 2,588,106 | Frangquist | Mar. 4, 1952 |
| 2,875,844 | Pring | Mar. 3, 1959 |